Patented Aug. 19, 1941

2,252,722

UNITED STATES PATENT OFFICE 2,252,722

AMINO ACID AMIDINES AND PROCESS OF PREPARING SAME

Karl Miescher and Willi Klarer, Riehen, and Ernst Urech, Basel, Switzerland, assignors, by mesne assignments, to Ciba Pharmaceutical Products, Incorporated, Summit, N. J., a corporation of New Jersey No Drawing. Application April 29, 1939, Serial No. 270,933. In Switzerland May 11, 1938

10 Claims. (Cl. 260—309)

This invention relates to the manufacture of new amidines by causing a reactive ester of an oxyalkyl amidine to react with a primary or secondary amine.

The compounds thus obtained may be supposed to comprise the structure

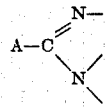

wherein A is an aminoalkyl radical containing a substituent at the nitrogen atom. The new amidines may be of open chain or cyclic form. In the latter case the two amidine nitrogen atoms are united together by an alkylene chain, for instance as in the imidazoline or the tetrahydropyrimidine ring.

Among the reactive esters of oxyalkylamidines used as parent materials in the invention there may be especially mentioned those derived from strong inorganic and organic acids, for instance hydrohalic acids or alkyl-sulfonic acids or arylsulfonic acids. These amidines may be obtained by the reaction of an amine with the corresponding carboxylic acid derivative, for instance the imidoethers.

Any substituted primary or secondary amine is suitable for the reaction, for instance, saturated and unsaturated alkylamine, alkylene diamines, alkanolamines, aralkylamines, aromatic or heterocyclic amines, for instance anilines, naphthylamines, amino-pyridines, aminoquinolines, aminobenzthiazoles or the like. There may also be used amines in which the nitrogen is cyclic-bound, as for instance in piperidine.

The invention affords a simple manner of producing amino-acid amidines. The compounds produced are useful in therapeutics.

Cross reference is made to companion application Ser. No. 270,932, filed on even date herewith, which relates to the manufacture of new cyclic amidines by causing an amino acid having an aromatic or heterocyclic radical as a substituent at the nitrogen atom or a derivative thereof to react with an aliphatic diamine.

The following examples illustrate the present invention, the parts being by weight:

Example 1

19.7 parts of chloracetpiperidine amidine hydrochloride (made from chloracetimido ether hydrochloride and piperidine) and 8.5 parts of piperidine are introduced into 200 parts of acetone containing 26 parts of potassium carbonate and the whole is heated under reflux for several hours. By evaporating the acetone solution thus obtained the piperidino-N-acetpiperidine amidine is left as the residue. This base forms a hydrochloride which melts at 218–219° C. and may be recrystallized from alcohol.

The reaction here involved may be represented by the following:

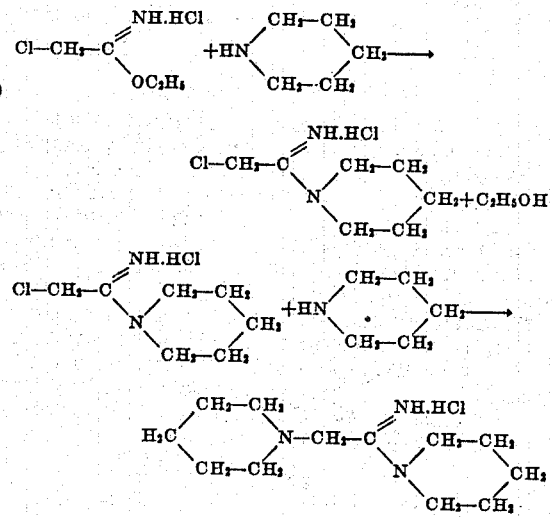

Example 2

10.2 parts of 2-chloromethylimidazoline (made from chloracetimido ether hydrochloride and ethylenediamine), 11.2 parts of n-dibutylamine and 25 parts of absolute alcohol are heated together to boiling for a short time. After distilling the alcohol, the residue is dissolved in a little water and by adding alkali the 2-(n-dibutylaminomethyl)-imidazoline thus produced separates in the form of an oil. It may be distilled at 123-125° C. in a vacuum of 0.6 mm. of mercury.

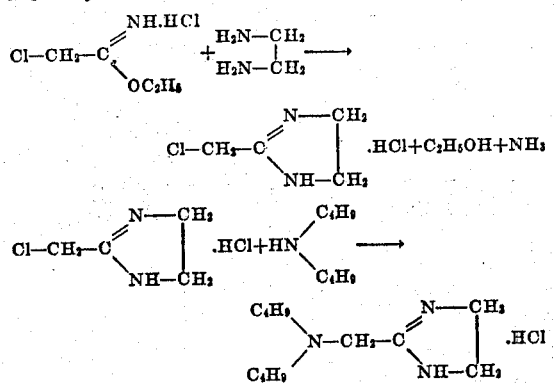

In like manner 2-laurylaminomethyl-imidazoline may be made.

Example 3

15.4 parts of 2-chloromethylimidazoline hydrochloride and 28 parts of aniline are heated together for 2 hours at 100–105° C. After cooling the mixture is ground with ether whereby the dihydrochloride of 2-(phenylaminomethyl)-imidazoline separates in the form of crystals. This dihydrochloride is soluble in water to an acid solution. By addition of caustic soda solution to the aqueous solution of the dihydrochloride until the reaction is neutral, evaporating the neutral solution and recrystallizing the residue from alcohol there is obtained 2-(phenylaminomethyl)-imidazoline hydrochloride which melts at 180–182° C.

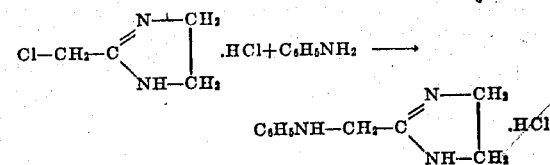

Example 4

18.2 parts of 2-chloropropylimidazoline hydrochloride (made by the reaction of γ-chlorobutyroimido-ether hydrochloride with ethylene diamine; the imido-ether hydrochloride is obtained by the action of hydrogen chloride on a mixture of equivalent quantities of γ-chlorobutyronitrile and alcohol) and 28 parts of aniline are heated together for 2 hours at 105–110° C. The mass is then ground with ether, the portion insoluble in ether is dissolved in water and the aqueous solution is mixed with alkali. This precipitates the 2-(phenylaminopropyl)-imidazoline which melts at 63° C. and forms a hydrochloride melting at 163–164° C.

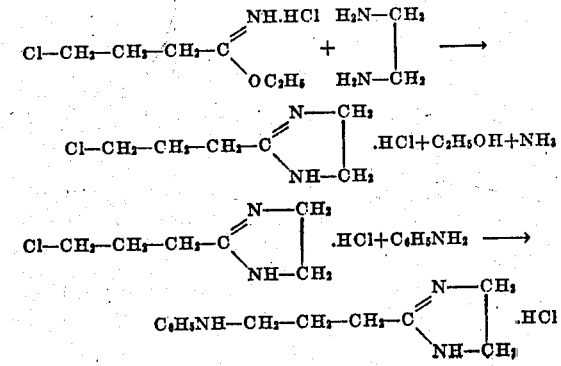

Example 5

15.4 parts of 2-chloromethylimidazoline hydrochloride and 28.6 parts of α-naphthylamine are finely pulverized and well mixed together and the mixture is heated for 1 hour at 70–75° C. The mass is then worked up as described in Example 3, whereby there is obtained the 2-(1-naphthylaminomethyl)-imidazoline hydrochloride in the form of transparent brownish crystals which melt at 218–222° C.

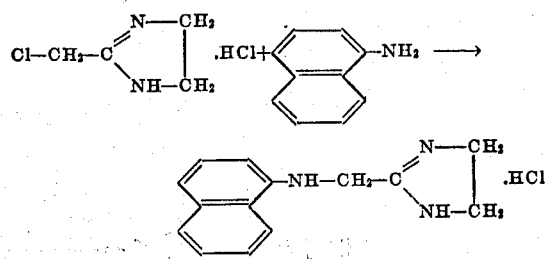

Example 6

9 parts of 2-chloromethylimidazoline and 13 parts of β:β-diethyl-β-phenylethylamine are together heated with 20 parts of alcohol for 1 hour at 60–70° C. and the alcohol is then removed in a vacuum. The residue is dissolved in water, potassium carbonate is added to the solution which is then extracted by means of ether. The ethereal solution is separated, dried and evaporated. The residue from this evaporation is dissolved in ethyl acetate and the solution is mixed with the calculated quantity of hydrochloric acid. In this manner the 2-(β:β-diethyl-β-phenylethylaminomethyl)-imidazoline hydrochloride is obtained in the form of an oil which soon solidifies. It may be recrystallized from a mixture of chloroform and ethyl acetate and then melts at 151–152° C.

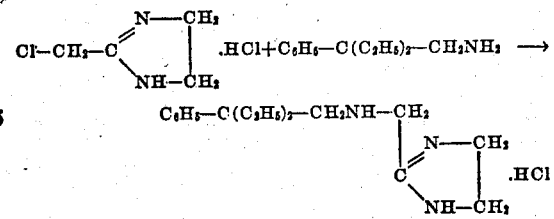

The same final products are obtained when instead of the hydrochloric acid esters the hydrobromic acid esters or the sulfonic acid esters of the oxyalkylamidines are used.

In an analogous manner the following compounds are made:

Phenylaminoacetamidine-hydrochloride _____ M. P. 135–137° C.
Phenylaminoacetpiperidine-amidine-hydrochloride _____ M. P. 148–150° C.
Phenylaminoacet-β-phenyl-ethylamidine-hydrochloride _____ M. P. 145–146° C.
2-methoxy-phenylaminoacetamidine-hydrochloride _____ M. P. 192–194° C.
4-methoxy-phenylaminoacetamidine-hydrochloride _____ M. P. 199–200° C. with decomposition
2-(2'-methoxy-phenylaminomethyl)-imidazoline-hydrochloride _____ M. P. 198–200° C.
6-methoxy-quinolyl-8-aminoacet-β-phenylethylamidine-hydrochloride _____ M. P. 146–147° C.

2-(6-methoxyquinolyl-8-aminomethyl)-imidazoline-hydrochloride_____ M. P. 193–195° C.
2-(6-methoxy-quinolyl-8-aminopropyl)-imidazoline-hydrochloride_____ M. P. 230–232° C. with decomposition

What we claim is:

1. A process for the manufacture of amino acid amidines, which comprises reacting a reactive ester of an oxyalkylimidazoline obtained by reacting the latter with a member of the group consisting of strong organic and inorganic acidic substances, with an amine.

2. A process for the manufacture of amino acid amidines, which comprises reacting a reactive ester of an oxyalkylimidazoline obtained by reacting the latter with a member of the group consisting of strong organic and inorganic acidic substances, with an aromatic amine.

3. A process for the manufacture of amino acid amidines, which comprises reacting a reactive ester of an oxyalkylimidazoline obtained by reacting the latter with a member of the group consisting of strong organic and inorganic acidic substances, with a heterocyclic amine.

4. A process for the manufacture of amino acid amidines, which comprises reacting a reactive ester of an oxyalkylimidazoline obtained by reacting the latter with a member of the group consisting of strong organic and inorganic acidic substances, with an aniline.

5. A process for the manufacture of amino acid amidines, which comprises reacting a halogenalkyl-imidazoline with an aniline.

6. A process for the manufacture of 2-(phenylaminomethyl)-imidazoline, which comprises reacting chloromethyl-imidazoline with aniline.

7. The imidazolines which are substituted at the 2-carbon atom of the imidazoline by a member of the group consisting of alkylaminoalkyl and aralkylaminoalkyl radicals the alkyl group attached directly to said 2-carbon atom consisting of carbon and hydrogen only.

8. 2-(n-dibutylaminomethyl)-imidazoline.

9. 2-laurylaminomethyl-imidazoline.

10. 2-($\beta$:$\beta$-diethyl-$\beta$-phenylethylamino-methyl)-imidazoline hydrochloride.

KARL MIESCHER.
WILLI KLARER.
ERNST URECH.